US010136470B2

(12) United States Patent
Cook

(10) Patent No.: US 10,136,470 B2
(45) Date of Patent: *Nov. 20, 2018

(54) MULTI-SERVICE PROVIDER WIRELESS ACCESS POINT

(71) Applicant: CenturyLink Intellectual Property LLC, Denver, CO (US)

(72) Inventor: Charles Ivan Cook, Louisville, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,425

(22) Filed: Jul. 13, 2017

(65) Prior Publication Data
US 2017/0311382 A1    Oct. 26, 2017

Related U.S. Application Data

(63) Continuation of application No. 15/295,510, filed on Oct. 17, 2016, now Pat. No. 9,743,462, which is a
(Continued)

(51) Int. Cl.
*H04W 88/10*     (2009.01)
*H04L 5/00*      (2006.01)
(Continued)

(52) U.S. Cl.
CPC .......... *H04W 88/10* (2013.01); *H04B 1/0003* (2013.01); *H04B 1/0064* (2013.01);
(Continued)

(58) Field of Classification Search
None
See application file for complete search history.

(56) References Cited

U.S. PATENT DOCUMENTS 4,775,997 A    10/1988 West, Jr. et al.
4,989,230 A    1/1991 Gillig et al.
(Continued)

FOREIGN PATENT DOCUMENTS

EP    1225775 A1    7/2002

OTHER PUBLICATIONS

US 9,125,233, 09/2015, Morrill et al. (withdrawn)
(Continued)

*Primary Examiner* — Hong Cho
(74) *Attorney, Agent, or Firm* — Adsero IP

(57) ABSTRACT

Novel tools and techniques that can provide wireless service for multiple service providers from a single, multi-service provider wireless access point. In an aspect, a multi-service provider wireless access point might communicate with a plurality of wireless devices, each associated with a different wireless carrier, and route communications from each device to the appropriate carrier (and/or, similarly, transmit communications from each carrier to the appropriate wireless device). In this way, for example, a single wireless access point could provide service to cellphones of subscribers of a number of different carriers. Such a wireless access point can provide enhanced efficiency and reduced cost, along with the ability to provide higher service for a number of wireless carriers.

25 Claims, 5 Drawing Sheets

Related U.S. Application Data continuation of application No. 13/541,839, filed on Jul. 5, 2012, now Pat. No. 9,497,800.

(51) Int. Cl.
*H04B 7/04* (2017.01)
*H04B 1/00* (2006.01)
*H04W 48/06* (2009.01)
*H04W 88/08* (2009.01)
*H04B 7/0404* (2017.01)

(52) U.S. Cl.
CPC ........... *H04B 7/0404* (2013.01); *H04L 5/001* (2013.01); *H04W 88/08* (2013.01); *H04W 48/06* (2013.01)

(56) References Cited

U.S. PATENT DOCUMENTS

| | | |
|---|---|---|
| 5,202,765 A | 4/1993 | Lineberry |
| 5,526,403 A | 6/1996 | Tam |
| 5,635,980 A | 6/1997 | Lin et al. |
| 5,740,075 A | 4/1998 | Bigham et al. |
| 5,771,465 A | 6/1998 | Bojeryd |
| 5,784,683 A | 7/1998 | Sistanizadeh et al. |
| 5,815,208 A | 9/1998 | Samuela et al. |
| 5,889,954 A | 3/1999 | Gessel et al. |
| 5,923,379 A | 7/1999 | Patterson |
| 5,971,921 A | 10/1999 | Timbel |
| 5,983,068 A | 11/1999 | Tomich et al. |
| 6,012,100 A | 1/2000 | Frailong et al. |
| 6,069,899 A | 5/2000 | Foley |
| 6,209,025 B1 | 3/2001 | Bellamy |
| 6,240,553 B1 | 5/2001 | Son et al. |
| 6,282,189 B1 | 8/2001 | Earnes |
| 6,359,973 B1 | 3/2002 | Rahamim et al. |
| 6,438,596 B1 | 8/2002 | Ueno et al. |
| 6,542,500 B1 | 4/2003 | Gerszberg et al. |
| 6,640,239 B1 | 10/2003 | Gidwani |
| 6,687,374 B2 | 2/2004 | Leuca et al. |
| 6,882,714 B2 | 4/2005 | Mansfield |
| 6,898,413 B2 | 5/2005 | Yip et al. |
| 7,114,169 B1 | 9/2006 | Kahn |
| 7,123,700 B1 | 10/2006 | Weaver et al. |
| 7,283,505 B1 | 10/2007 | Meenan et al. |
| 7,369,838 B1 | 5/2008 | Murray et al. |
| 7,617,317 B2 | 11/2009 | Jones et al. |
| 7,631,047 B1 | 12/2009 | Adamcyzk et al. |
| 7,673,321 B2 | 3/2010 | Yurt et al. |
| 7,792,996 B2 * | 9/2010 | Monette ................... H04L 12/18 370/328 |
| 8,050,281 B2 | 10/2011 | Casey et al. |
| 8,082,353 B2 * | 12/2011 | Huber ................. G06Q 20/1235 709/229 |
| 8,086,271 B2 * | 12/2011 | Dent ..................... H04W 88/08 370/207 |
| 8,127,011 B2 * | 2/2012 | Monette ................ H04L 47/748 370/230 |
| 8,213,384 B2 | 7/2012 | Breuer et al. |
| 8,447,332 B2 * | 5/2013 | Weinreich ............. G01S 5/0036 370/338 |
| 8,490,129 B2 | 7/2013 | Phillips et al. |
| 8,537,814 B2 | 9/2013 | Phillips et al. |
| 8,713,617 B2 | 4/2014 | Phillips et al. |
| 9,392,641 B2 | 7/2016 | Morrill et al. |
| 9,497,800 B2 | 11/2016 | Cook |
| 9,591,602 B2 * | 3/2017 | Bamburak ............ H04W 48/16 |
| 9,743,462 B2 | 8/2017 | Cook |
| 9,872,339 B2 | 1/2018 | Morrill et al. |
| 2001/0012319 A1 | 8/2001 | Foley |
| 2002/0013847 A1 | 1/2002 | Fisher et al. |
| 2002/0021465 A1 | 2/2002 | Moore et al. |
| 2002/0037004 A1 | 3/2002 | Bossemeyer et al. |
| 2002/0063924 A1 | 5/2002 | Kimbrough et al. |
| 2002/0087724 A1 | 7/2002 | Datta et al. |
| 2002/0101858 A1 | 8/2002 | Stuart et al. |
| 2002/0110115 A1 | 8/2002 | Gorman et al. |
| 2002/0124247 A1 | 9/2002 | Houghton |
| 2003/0026416 A1 | 2/2003 | Fusco |
| 2003/0078962 A1 | 4/2003 | Fabbricatore |
| 2003/0106067 A1 | 6/2003 | Hoskins |
| 2004/0008761 A1 | 1/2004 | Keliher et al. |
| 2004/0044736 A1 | 3/2004 | Austin-Lane et al. |
| 2004/0053600 A1 | 3/2004 | Chow |
| 2004/0078457 A1 | 4/2004 | Tindal |
| 2004/0100975 A1 | 5/2004 | Kreiner et al. |
| 2004/0136373 A1 | 7/2004 | Bareis |
| 2004/0181692 A1 * | 9/2004 | Wild ..................... H04W 48/14 726/4 |
| 2004/0213286 A1 | 10/2004 | Jette et al. |
| 2005/0071882 A1 | 3/2005 | Rodriguez et al. |
| 2005/0266720 A1 | 12/2005 | Lin |
| 2006/0068793 A1 | 3/2006 | Van Lieshout et al. |
| 2006/0191005 A1 | 8/2006 | Muhamed et al. |
| 2007/0097956 A1 * | 5/2007 | Okmianski ............. H04L 67/16 370/352 |
| 2007/0247262 A1 * | 10/2007 | Park ....................... H01P 1/205 333/202 |
| 2008/0081557 A1 | 4/2008 | Murray et al. |
| 2008/0160984 A1 * | 7/2008 | Benes ................. H04M 1/7253 455/419 |
| 2009/0017862 A1 | 1/2009 | Yaginuma |
| 2009/0131023 A1 * | 5/2009 | Lorello .................... H04L 51/22 455/412.1 |
| 2009/0182768 A1 * | 7/2009 | Stevens ................. H04W 24/02 |
| 2009/0201830 A1 * | 8/2009 | Angelot .................. H04L 12/66 370/254 |
| 2010/0027482 A1 * | 2/2010 | Murakami ............ H04L 5/0037 370/329 |
| 2010/0082775 A1 * | 4/2010 | Banga ............... G06F 17/30867 709/219 |
| 2010/0195562 A1 | 8/2010 | Ishizu |
| 2011/0131338 A1 | 6/2011 | Hu |
| 2011/0299626 A1 | 12/2011 | Kim et al. |
| 2012/0027145 A1 | 2/2012 | Uyehara et al. |
| 2012/0045012 A1 | 2/2012 | Alapuranen |
| 2012/0077492 A1 | 3/2012 | Bamburak et al. |
| 2012/0095826 A1 | 4/2012 | Baur et al. |
| 2012/0134279 A1 | 5/2012 | Tamaki |
| 2012/0254349 A1 * | 10/2012 | Quigley .................. H04L 67/20 709/217 |
| 2013/0155849 A1 * | 6/2013 | Koodli .................. H04L 45/308 370/230 |
| 2013/0235874 A1 | 9/2013 | Ringdahl et al. |
| 2013/0272696 A1 | 10/2013 | Palanisamy |
| 2013/0273962 A1 | 10/2013 | Phillips et al. |
| 2013/0308470 A1 | 11/2013 | Bevan et al. |
| 2013/0329745 A1 | 12/2013 | Phillips et al. |
| 2013/0333016 A1 * | 12/2013 | Coughlin .............. H04W 12/06 726/9 |
| 2014/0010149 A1 | 1/2014 | Cook |
| 2014/0010171 A1 | 1/2014 | Morrill et al. |
| 2014/0050167 A1 | 2/2014 | Smedman et al. |
| 2014/0113671 A1 | 4/2014 | Schwengler |
| 2014/0233951 A1 | 8/2014 | Cook |
| 2014/0321858 A1 | 10/2014 | Cook |
| 2015/0334647 A1 | 11/2015 | Morrill et al. |
| 2017/0041985 A1 | 2/2017 | Cook |
| 2018/0146508 A1 | 5/2018 | Morrill et al. |

OTHER PUBLICATIONS

ATM access network architecture; Meada, Y.; Kikuchi, K.; Tokura, N.: Communications, 1991. ICC 91, Conference Record; IEEE International Conference on Jun. 23-26, 1991; Pates 687-691 vol. 2; Digital Object Identifier 1031109/ICC.1991.162450.

Frank, Edward and Holloway, Jack; "Connecting the Home with a Phone Line Network Chip Set," IEEE Micro, Mar.-Apr. 2000, pp. 2-14.

NextNet Wireless, NextNet Expedience, NLOS Plug-and-Play Portable Customer Premise Equipment Integrated Radio Modem, Non

(56) References Cited

OTHER PUBLICATIONS

Line-of-Sight Broadband Wireless Residential Subscriber Unit (RSU-2510A), http://www.nextnetwireless.com/assets/news/media/PDF/rsu_2510, Oct. 2017.
U.S. Appl. No. 10/854,738; Issue Notification dated Oct. 12, 2011; 1 page.
U.S. Appl. No. 10/356,338: Office Action dated Aug. 16, 2011; 25 pages.
U.S. Appl. No. 10/356,338; Final Office Action dated Mar. 14, 2012; 29 pages.
U.S. Appl. No. 10/356,338; Final Rejection dated Mar. 29, 2011; 25 pages.
U.S. Appl. No. 10/356,338; Final Rejection dated Jul. 7, 2009; 27 pages.
U.S. Appl. No. 10/356,338; Issue Notification dated Aug. 28, 2013; 1 page.
U.S. Appl. No. 10/356,338; Non-Final Rejection dated Oct. 26, 2010; 23 pages.
U.S. Appl. No. 10/356,338; Non-Final Rejection dated Dec. 30, 2008; 43 pages.
U.S. Appl. No. 10/356,338; Notice of Allowance dated May 13, 2013; 28 pages.
U.S. Appl. No. 10/356,364; Non-Final Office Action dated Sep. 29, 2005; 9 pages.
U.S. Appl. No. 10/356,364; Issue Notification dated Jan. 31, 2007; 1 page.
U.S. Appl. No. 10/367,596; Decision on Appeal dated Apr. 23, 2012; 10 pages.
U.S. Appl. No. 10/367,596; Final Rejection dated Dec. 5, 2012; 11 pages.
U.S. Appl. No. 10/367,596; Non-Final Rejection dated Aug. 24, 2012; 12 pages.
U.S. Appl. No. 10/444,941; Corrected Notice of Allowability dated Mar. 20, 2014; 9 pages.
U.S. Appl. No. 10/444,941; Decision on Appeal dated Aug. 2, 2013; 13 pages.
U.S. Appl. No. 10/444,941; Issue Notification dated Apr. 9, 2014; 1 page.
U.S. Appl. No. 10/444,941; Notice of Allowance dated Dec. 5, 2013; 25 pages.
U.S. Appl. No. 10/676,429; Final Office Action dated Feb. 13, 2012; 30 pages.
U.S. Appl. No. 10/676,429; Issue Notification dated Jun. 26, 2013; 1 page.
U.S. Appl. No. 10/676,429; Notice of Allowance dated Mar. 12, 2013; 41 pages.
U.S. Appl. No. 10/854,774; Final Office Action dated Jul. 5, 2011; 39 pages.
U.S. Appl. No. 12/841,877; Final Rejection dated Jan. 6, 20014; 15 pages.
U.S. Appl. No. 12/841,877; Final Rejection dated Oct. 10, 2012; 15 pages.
U.S. Appl. No. 12/841,877; Non Final Office Action dated Feb. 2, 2012; 13 pages.
U.S. Appl. No. 12/841,877; Non-Final Rejection dated Jun. 17, 2013; 16 pages.
U.S. Appl. No. 13/243,706; Notice of Publication dated Jan. 19, 2012; 1 page.
U.S. Appl. No. 13/541,839; Final Rejection dated Dec. 16, 2015; 14 pages.
U.S. Appl. No. 13/541,839; Final Rejection dated Apr. 2, 2015; 13 pages.
U.S. Appl. No. 13/541,839; Final Rejection dated Jul. 10, 2014; 15 pages.
U.S. Appl. No. 13/541,839; Issue Notification dated Oct. 26, 2016; 1 page.
U.S. Appl. No. 13/541,839; Non-Final Office Action dated Feb. 21, 2014; 16 pages.
U.S. Appl. No. 13/541,839; Non-Final Office Action dated Jul. 28, 2015; 14 pages.
U.S. Appl. No. 13/541,839; Non-Final Rejection dated Dec. 26, 2014; 14 pages.
U.S. Appl. No. 13/541,839; Non-Final Rejection dated Mar. 29, 2016; 14 pages.
U.S. Appl. No. 13/541,839; Notice of Allowance dated Jul. 15, 2016; 13 pages.
U.S. Appl. No. 13/541,839; Notice of Panel Decision dated Nov. 17, 2014; 2 pages.
U.S. Appl. No. 13/541,839; Notice of Panel Decision from Pre-Appeal Brief Review dated Feb. 4, 2016; 2 pages.
U.S. Appl. No. 13/827,163; Continuation-in-part Application filed Mar. 14, 2013; 63 pages.
U.S. Appl. No. 13/827,163; Issue Notification dated Jun. 22, 2016; 1 page.
U.S. Appl. No. 13/827,163; Issue Notification dated Aug. 12, 2015; 1 page.
U.S. Appl. No. 13/827,163; Notice of Allowance dated Mar. 10, 2016; 21 pages.
U.S. Appl. No. 13/827,163; Notice of Allowance dated Apr. 29, 2015; 21 pages.
U.S. Appl. No. 13/827,163; Office Action dated Feb. 26, 2015; 26 pages.
U.S. Appl. No. 13/915,930; Final Rejection dated Mar. 18, 214; 46 pages.
U.S. Appl. No. 13/915,930; Non-Final Rejection dated Oct. 25, 2013; 65 pages.
U.S. Appl. No. 13/965,830; Final Rejection dated Oct. 6, 2016; 29 pages.
U.S. Appl. No. 13/965,830; Non-Final Rejection dated Feb. 25, 2016; 47 pages.
U.S. Appl. No. 13/965,830; Non-Final Rejection dated Jun. 15, 2017; 26 pages.
U.S. Appl. No. 14/261,219; Final Rejection dated Jan. 26, 2017; 38 pages.
U.S. Appl. No. 14/261,219; Non-Final Rejection dated May 25, 2016; 57 pages.
U.S. Appl. No. 14/261,226; Final Rejection dated Jan. 26, 2017; 44 pages.
U.S. Appl. No. 14/261,226; Non-Final Rejection dated May 12, 2016; 62 pages.
U.S. Appl. No. 14/261,226; Non-Final Rejection dated Jul. 26, 2017; 31 pages.
U.S. Appl. No. 14/808,973; Non-Final Rejection dated Apr. 24, 2017; 49 pages.
U.S. Appl. No. 14/808,973; Notice of Allowance dated Oct. 12, 2017; 28 pages.
U.S. Appl. No. 15/295,510; Non-Final Rejection dated Mar. 1, 2017; 13 pages.
U.S. Appl. No. 15/295,510; Notice of Allowance dated Apr. 3, 2017; 12 pages.
U.S. Appl. No. 10/676,429; Non Final Office Action dated Oct. 3, 2011; 29 pages.
U.S. Appl. No. 10/676,429, Final Office Action dated Mar. 3, 2011, 33 pages.
U.S. Appl. No. 10/676,429, Notice of Panel Decision dated Jun. 16, 2011, 2 pages.
U.S. Appl. No. 10/854,738, Notice of Allowance dated Jun. 23, 2011, 8 pages.
U.S. Appl. No. 10/854,738, Office Action dated Mar. 14, 2011, 14 pages.

* cited by examiner

MULTI-SERVICE PROVIDER WIRELESS ACCESS POINT

CROSS-REFERENCE TO RELATED APPLICATIONS

This application is a continuation of U.S. patent application Ser. No. 15/295,510 (the "'510 Application"), filed Oct. 17, 2016 by Charles Ivan Cook, entitled, "Multi-Service Provider Wireless Access Point," which is a continuation of U.S. patent application Ser. No. 13/541,839 (the "'839 Application") (now U.S. Pat. No. 9,497,800), filed Jul. 5, 2012 by Charles Ivan Cook, entitled, "Multi-Service Provider Wireless Access Point." The entire disclosures of which are incorporated herein by reference in its entirety for all purposes.

COPYRIGHT STATEMENT

A portion of the disclosure of this patent document contains material that is subject to ° copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to wireless service provider networks, and more particularly, to tools and techniques that enable a single base station to serve subscribers of multiple service providers.

BACKGROUND

Wireless service providers employ access points (also known in the art as "base stations") to provide wireless service to wireless subscriber devices (such as cell phones, wireless PDAs, wireless tablet computers, wireless modems, and the like). The location of such access points is often constrained by geographic features, local regulation, and/or cost. To address some of these issues, multiple wireless service providers will often collocate base stations, resulting in a single location (such as a tower, building spire, etc.) having multiple antennas, radios, and other base station hardware.

This solution is inefficient because it results in a large degree of hardware redundancy, but it is often unavoidable, for several reasons. For instance, most wireless providers are allocated a discrete frequency band for their exclusive use, and a given wireless provider will employ base station hardware tuned specifically for that provider's allocated spectrum. Additionally, each provider's base station maintains exclusive connectivity with that provider's network. Thus, while the concept of a "shared" access point that can serve multiple wireless providers could provide enhanced efficiencies, both in terms of cost and utilization of limited space in prime locations, the realization of that concept is constrained by significant technical hurdles.

One such hurdle is the disparities in radio frequency ("RF") communications employed by different wireless providers to provide communication between the access point and the subscribers' wireless devices. These disparities include different transmission frequency bands, different modulation schemes, and the like. Another hurdle is the distribution of traffic between a shared access point and the networks of different wireless providers. Using conventional techniques, there is no way to distinguish the traffic of one wireless provider from another. These issues, and others, stand in the way of effective implementation of shared wireless access points.

Hence, there is a need for solutions that can overcome technical hurdles to allow the provision of shared wireless access points.

BRIEF SUMMARY

A set of embodiments offers solutions that can provide wireless service for multiple service providers from a single, multi-service provider wireless access point. In an aspect, a multi-service provider wireless access point might communicate with a plurality of wireless devices, each associated with a different wireless carrier, and route communications from each device to the appropriate carrier (and/or, similarly, transmit communications from each carrier to the appropriate wireless device). In this way, for example, a single wireless access point could provide service to cellphones of subscribers of a number of different carriers. Such a wireless access point can provide enhanced efficiency and reduced cost, along with the ability to provide higher service for a number of wireless carriers.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a method of providing wireless service for multiple service providers from a single access point, in accordance with one set of embodiments, might comprise providing a multi-service provider wireless access point. The access point, in one aspect, might having one or more radios to communicate with wireless devices and an uplink connection to a plurality of wireless service providers. The method might further comprise receiving, at the multi-service provider wireless access point, a communication from a wireless device.

In some embodiments, the method further comprises collecting, e.g., at the multi-service provider wireless access point, an identifier of the wireless device from the communication, and/or identifying, from the identifier of the wireless device, a wireless service provider serving the wireless device. The method might further comprise receiving, at the multi-service provider wireless access point, one or more subsequent communications from the wireless device, and/or routing, from the multi-service provider wireless access point, the one or more subsequent communications to the identified wireless service provider, over the uplink connection.

A multi-service provider wireless access point in accordance with another set of embodiments might comprise one or more radios to communicate with wireless devices and an uplink connection to a plurality of wireless service providers. The access point might further comprise a processor and a non-transitory machine readable medium having encoded thereon a set of instructions executable by the processor to perform one or more operations, including without limitation instructions to perform operations in accordance with methods provided by various embodiments.

Merely by way of example, in one embodiment, the set of instructions might comprise instructions to receive a communication from a wireless device, and instructions to obtain, from the communication, an identifier of the wireless device. The set of instructions might further include instructions to identify, from the identifier of the wireless device, a wireless service provider serving the wireless device. In some cases, the set of instructions might comprise instructions to receive one or more subsequent communications from the wireless device, and/or instructions to route the one or more subsequent communications to the identified wireless service provider, over the uplink connection.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1A:
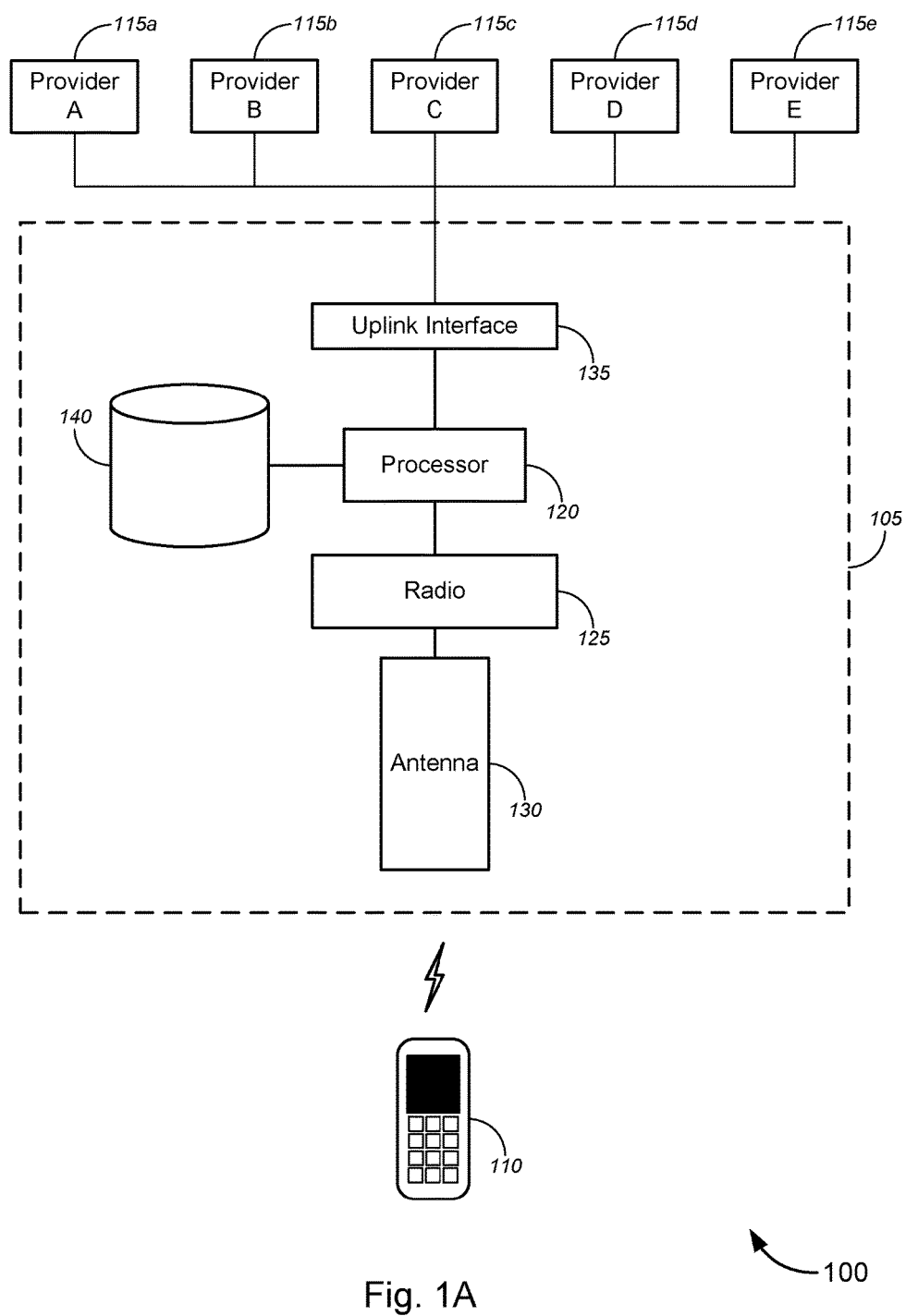
FIGS. 1A-1C are a block diagrams illustrating systems for providing wireless services for multiple service providers through a single access point, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

A set of embodiments offers solutions that can provide wireless service for multiple service providers from a single, multi-service provider wireless access point. Thus, instead of requiring multiple access points collocated at the same location (or located near one another), certain embodiments can allow for the installation of a single access point, with substantial efficiencies in cost, space, and aesthetics, while still serving subscribers of multiple service providers. Some embodiments can support different wireless access technologies (code division multiple access ("CDMA"), Global System for Mobile communications ("GSM"), Long Term Evolution ("LTE"), etc.) and/or different frequency bands (e.g., 700 MHz, 1800 MHz, etc.) employed by different carriers using one or more radios in the access point. Some embodiments can support technologies, such as WiFi, developed for and/or deployed in unlicensed spectrum; other embodiments might employ cognitive radio technologies designed to share spectrum, such as "TV White Space" spectrum.

In another aspect, a multi-service provider wireless access point might communicate with a plurality of wireless devices, each associated with a different wireless carrier. The access point might feature an uplink connection that provides connectivity with each of the wireless service providers, and the access point might route communications from each device over the uplink connection to the appropriate provider (and/or, similarly, transmit communications from each provider to the appropriate wireless device).

FIG. 1A illustrates a system 100 employing a multi-service provider wireless access point 105 in accordance with one set of embodiments. The multi-service provider wireless access point 105 provides communication between a wireless device 110 and one of a plurality of wireless service providers (carriers) 115. As illustrated by FIG. 1A, the multi-service provider wireless access point 105 comprises a processor 120, which can be programmed with instructions to control the operation of the multi-service provider wireless access point 105, as described herein (including causing the multi-service provider wireless access point 105 to operate in accordance with the methods described below). The multi-service provider wireless access point 105 also comprises a wireless radio 125 in communication with the processor 120 and an antenna 130. The radio 125 communicates with the wireless device 110, via the antenna 130 using wireless radio frequency ("RF") signals.

An uplink interface 135 in communication with the processor 120 provides an uplink connection with the plurality of wireless service providers 115, providing connectivity between the multi-service provider wireless access point 105 and the providers 115 (and, ultimately, between the wireless device 110 and one of the providers 115, through the multi-service provider wireless access point 105). The uplink interface 135, as can be appreciated, generally will be specific to the type of uplink connection, and the interface 135 can include whatever hardware and/or software are necessary or appropriate to support the uplink connection, such as an appropriate port, communication chipset, etc. A variety of different uplink connections are possible in accordance with different embodiments. For instance, in some cases, the uplink connection can comprise an Ethernet connection and/or the like. Additionally and/or alternatively, the uplink connection might comprise an optical connection, such as a passive optical network ("PON") circuit, a synchronous optical network ("SONET") ring, and/or the like. Any type of digital access technology, including without limitation digital subscriber line ("DSL"), Data Over Cable Service Interface Specification ("DOCSIS"), etc., can be used to provide the uplink connection, provided the digital access technology has sufficient performance functionality to support the traffic passing through the access point 105.

The uplink connection, in an aspect, might provide connectivity between the multi-service provider wireless access point 105 and a telecommunication provider's core network, which in turn provides connectivity to each of the wireless service providers 115 (e.g., through peering relationships, the Internet, etc.). The telecommunication provider might be, but need not necessarily be, one of the wireless service providers 115. Alternatively and/or additionally, if a wireless service provider 115 has a relationship with a wireline service provider operating the access point 105, it is possible that the wireless service provider 115 could have the access point 105 direct the connection to the wireline or other service provider to perform call processing on behalf of the wireless service provider 115 that actually serves the subscriber. Similarly, if one wireless service provider 115a has a relationship with a second wireless service provider 115b, such that the second service provider 115b has access to necessary authentication information, the second service 115b provider could assume the responsibility of call processing of the original service provider 115a in the case of an emergency by securely informing the multiservice access point via an update to a provider identification database (described below) to route the calls to the second service provider 115b. Alternatively and/or additionally, a single service provider 115 could use a similar database update technique to route calls from the access point 105 to an alternate mobile switching center ("MSC") for load balancing or other reasons.

The multi-service provider wireless access point 105 might also include a computer readable storage medium 140, such as a hard drive, solid state memory, firmware, etc. This medium can store instructions for programming the processor 120 to cause the multi-service provider wireless access point 105 to operate as described herein. The medium 140 might also have stored thereon one or more databases (or other data stores) as described in further detail below. (Such databases/data stores can also be located in other locations, so long as they are accessible—e.g., via the uplink connection—to the multi-service provider wireless access point 105).

Figure 1B:
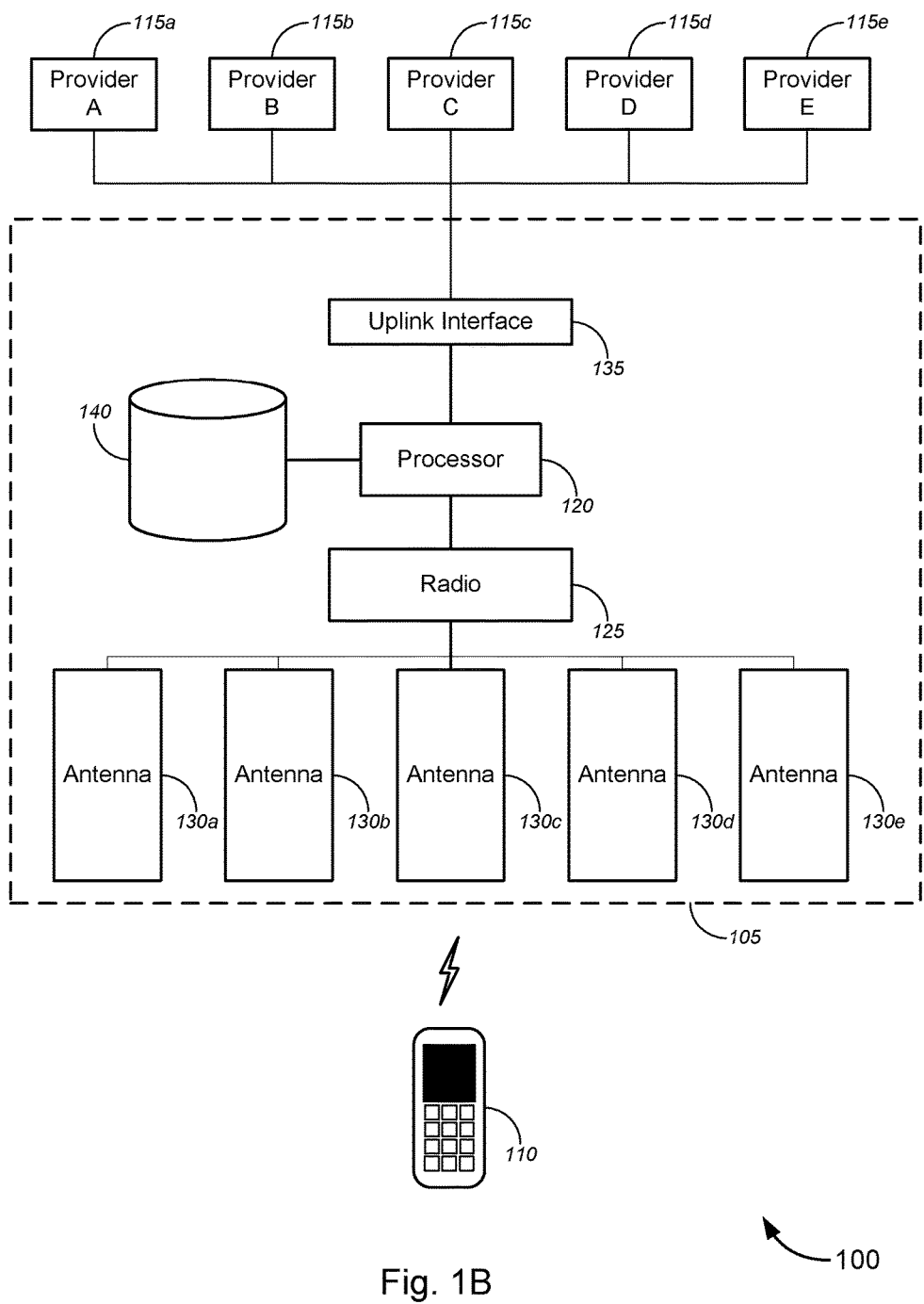
Figure 1C:
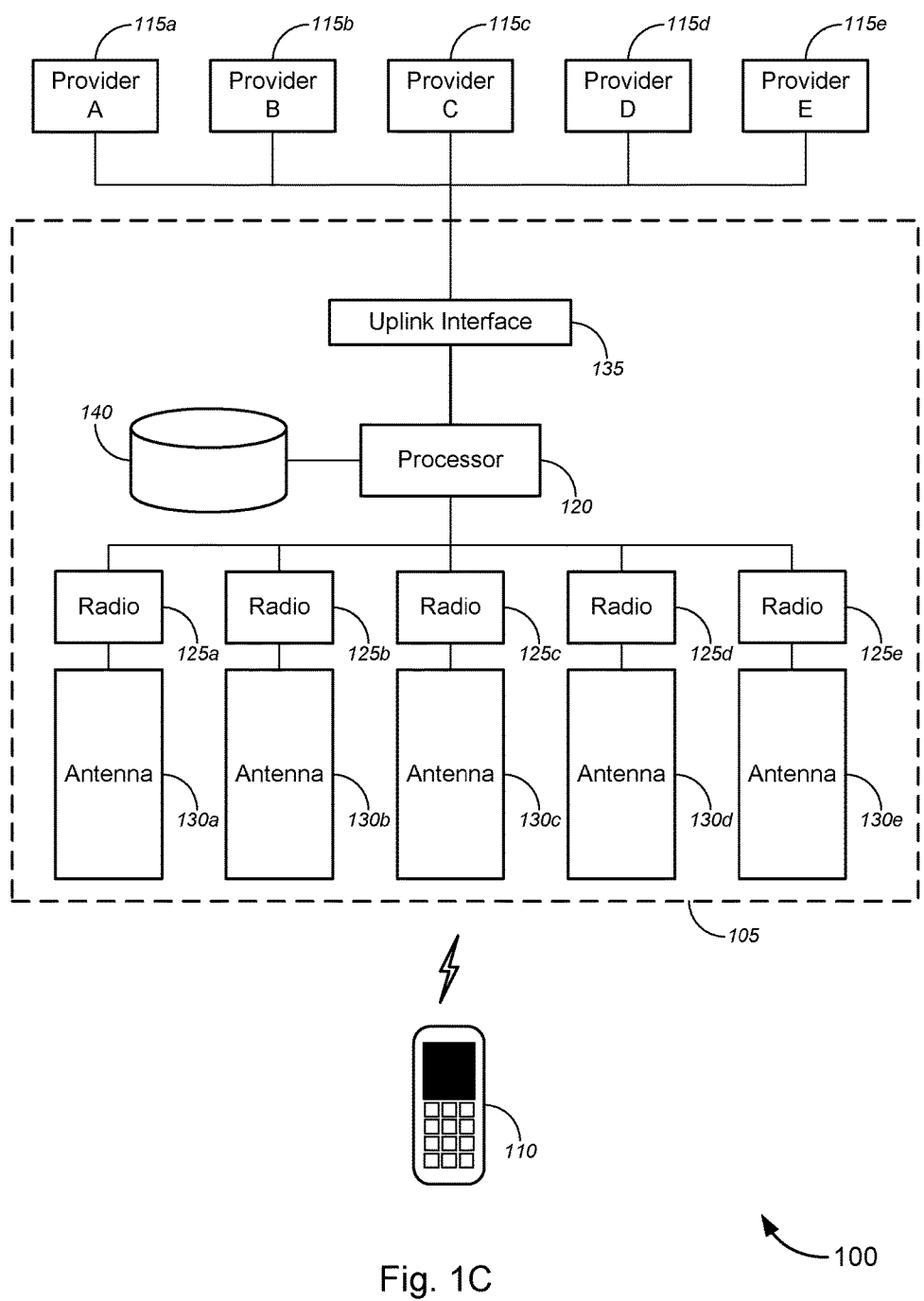

Various embodiments can support a number of different radio and antenna arrangements. Merely by way of example, FIG. 1A illustrates a multi-service provider wireless access point 105 with a single radio 125 and a single antenna 130. In other embodiments, as illustrated by FIG. 1B, a multi-service provider wireless access point 105 might comprise a single radio 125 in communication with a plurality of antennas. In further embodiments, as illustrated by FIG. 1C, a multi-service provider wireless access point might comprise a plurality of radios 125, each of which is in communication with one (or more) of a plurality of antennas 130. In an aspect, the use of multiple antennas 130 can enable efficient transmission and reception over a wide range of radio spectrum. In certain embodiments, for example, the processor 120 is programmed to manage which antenna or antennas 130 is used at any given instant of time, either directly or through a switching mechanism.

These different arrangements (as illustrated in non-limiting fashion by FIGS. 1A-1C) can support a number of different configurations that allow the multi-service provider wireless access point 105 to provide wireless service to subscribers of multiple providers 115. Merely by way of example, in the embodiment illustrated by FIG. 1C, each radio 125 might transmit/receive on a frequency band that is allocated to one or more providers 115. For instance, one radio 125a might transmit and receive on the 700/800 MHz band, which is allocated (e.g., by the FCC) to, and/or used by, a first provider 115a. Another radio 125b might transmit and receive on the 1800/1900 MHz band, which might be allocated to, and/or used by, Provider B 115b and Provider C 115c. In other embodiments, different radios 125 might support different modulation and/or access technologies; for example, one radio 125 might communicate using CDMA, while another radio might communicate using GSM, and a third radio might communicate using LTE. Many such arrangements are possible, and embodiments are not limited to the use of licensed spectrum. In an exemplary aspect of some embodiments, unlike conventionally collocated, but separate, access points for different providers, all of the radios are part of the same access point 105, are controlled by the same processor 120 (or processors) and share an uplink interface 135.

In other configurations, such as those illustrated by FIGS. 1A and 1B, a single radio 125 might communicate (i.e., transmit and/or receive) on multiple frequency bands and/or for multiple providers 115. A number of different techniques can be used to provide this functionality. Merely by way of example, in some embodiments, the radio 125 employs orthogonal frequency-division multiple access ("OFDMA") modulation to allow the radio 125 to transmit on multiple bands. In some cases, as illustrated by FIG. 1B, a single radio 125 might communicate through a plurality of antennas 130, and the antennas 130 can be assigned to different sub-bands, such that the radio 125 communicates on a particular sub-band using a particular antenna 130 or antennas. As described in further detail below, the antenna(s) 130 for a particular sub-band might be selected to optimize the performance for that sub-band. Merely by way of example, the antennas 130 might have different lengths, and the length of a particular antenna might be tuned a portion of radio frequency spectrum where it radiates and receives RF energy efficiently.

As noted above, different embodiments support a variety of configurations. For example, some embodiments support multiple carriers (wireless service providers) on the same radio 125 assuming that the carriers are using the same radio technology (e.g., LTE, WiMAX, etc.). In some such embodiments, this can be done using a base radio 125 that is able to operate over a wide spectrum band and logic to match the appropriate antenna(s) 130 to the radio 125 at the time they are needed. Another set of embodiments, however, can employ a dynamic implementation of a software defined radio ("SDR") as the radio 125. Multiple instances of an SDR can be run by a processor (e.g., the processor 120), and the processor can match the appropriate modulated signal to the appropriate antenna. So Provider A 115a could communicate with its subscribers over LTE using spectrum Aa and Provider B 115b could transmit/receive over WiMAX using spectrum Bb. The processor 120, then, could execute instances of the SDR and map the appropriate antennas 130 to service both providers. The number of SDRs that could be supported might depend on the number of processors and/or the speed of those processors.

Figure 2:
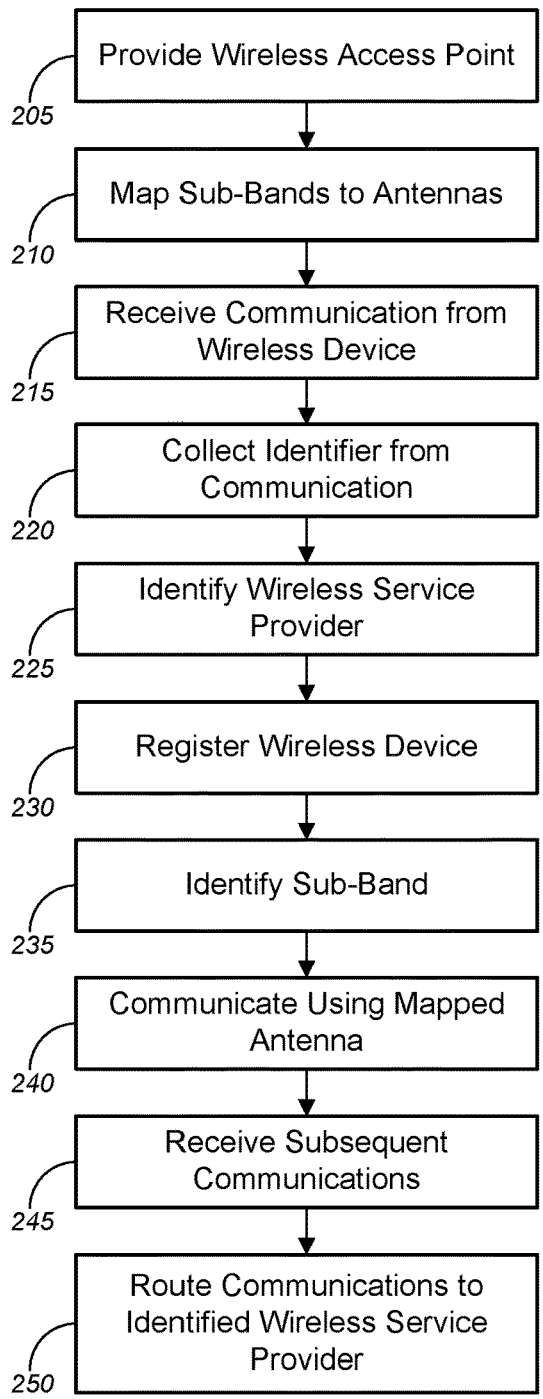
FIG. 2 is a process flow diagram illustrating a method of providing wireless services for multiple service providers through a single access point, in accordance with various embodiments.

FIG. 2 illustrates a method 200 of providing wireless service for multiple service providers from a single access point, in accordance with one set of embodiments. While the techniques and procedures of the method 200 are depicted and/or described in a certain order for purposes of illustration, it should be appreciated that certain procedures may be reordered and/or omitted within the scope of various embodiments. Moreover, while the method 200 can be implemented by (and, in some cases, are described below with respect to) the systems illustrated by FIGS. 1A-1C (or components thereof), these methods may also be implemented using any suitable hardware implementation. Similarly, while those systems (and/or components thereof) can operate according to the method 200 (e.g., by executing instructions embodied on a computer readable medium), the systems can also operate according to other modes of operation and/or perform other suitable procedures.

The method 200 might comprise providing a multi-service provider wireless access point (block 205). The access point, in one aspect, might having one or more radios to communicate with wireless devices and an uplink connection to a plurality of wireless service providers. Providing an access point can comprise any of a variety of operations, such as installing the access point, providing power and/or network connectivity for the access point, communicating with the access point (e.g., via the uplink connection), and/or the like. Broadly stated, any operation related to the installation, setup, operation, and/or maintenance of an access point can be considered providing the access point.

As noted above, an access point radio in certain embodiments might employ OFDMA modulation. In some such embodiments, the method 200 might comprise mapping one or more OFDMA sub-bands to one or more antennas (block 210), such that when a sub-band is mapped to a particular antenna, the radio employs that antenna to communicate on that sub-band. A number of techniques can be used to map antennas to sub-bands. Merely by way of example, in some cases, the method might include identifying certain antennas in an antenna array that provide enhanced communication performance for a particular sub-band, for example, based on site-specific RF characteristics, antenna length (as compared to the sub-band frequency), etc. The antenna(s) identified as providing enhanced communication for a particular sub-band might then be mapped to that sub-band.

In some embodiments, the radio(s) might be configured to transmit pilot signals on particular bands in a round-robin basis, transmitting on one band, then the next, etc., or according to some other algorithm that may provide priority to a particular wireless service provider in a particular band. The radio can also listen for an access request from a client radio (e.g., a wireless device). Once a request to access the network is received, the multi-service provider access point can adjust its timing/algorithms so as to appropriately service the call. If only one wireless service provider is using the access point, all resources can be dedicated to that service provider. The algorithm can be dynamically adjusted based on a variety of parameters, including but not limited to, the number of service providers sharing the access point, the number of client radios accessing the access point, contracted service provider priorities, received signal strength, signal-to-noise ratio ("SNR")/interference indicators, etc. In other words, the access point is treated as a pooled resource among all the service providers that are sharing it.

As illustrated, the method 200 further comprises receiving, at the multi-service provider wireless access point, a communication from a wireless device (block 215). For instance, in an embodiment, the communication from a wireless device might comprise a conventional wireless registration message. More broadly, the communication from the wireless device can be any communication that provides sufficient information for the multi-service provider wireless access point to identify the device, as described further below. In some cases, the communication might be a response to an interrogating communication from the multi-service provider wireless access point itself.

In some embodiments, the method 200 further comprises collecting, e.g., at the multi-service provider wireless access point, an identifier of the wireless device from the communication (block 220). The identifier can comprise any data that can be used to identify the wireless device. Merely by way of example, the identifier might comprise the telephone number assigned to the wireless device. Alternatively, the identifier might comprise the mobile identification number ("MIN") of the wireless device, the electronic serial number ("ESN") of the wireless device, a media access control ("MAC") address, or any other identifier that is sufficiently unique to permit identification of the wireless device.

The method 200 can further include, at block 225, identifying a wireless service provider serving the wireless device; after the wireless service provider has been identified, the multi-service provider wireless access point can register the wireless device with the wireless service provider's network (block 230). A number of techniques can be used to identify the wireless service provider. For example, in some cases, the communication from the wireless device might include information identifying the wireless service provider. In other cases, however, the service provider can be identified, at least in part, based on the identifier of the wireless device.

For example, some embodiments maintain a database that correlates wireless device identifiers (whether the mobile telephone number, the MIN, the ESN, or another identifier) with wireless service providers. In some embodiments, the method 200 might comprise storing the database on the multi-service provider wireless access point. In other embodiments the database might be stored at any other suitable location accessible by the multi-service provider wireless access point. Hence, the database might be remote from the multi-service provider wireless access point, and/or the method 200 might comprise accessing the database over the uplink connection.

The database might be populated based on data provided by the wireless service providers themselves and/or by data obtained through other sources. Such databases might be replicated among a plurality of multi-service provider wireless access points. In one aspect, the database might include a record for a plurality of wireless devices, and the record might include a field that lists one or more wireless place identifiers for that wireless device and a field that contains the identity of the wireless service provider that provides service for that wireless device. The wireless device identifier field might be a key field in the database, such that the wireless access point can access the database and search the database for a record containing the identifier the wireless device; that record will include an identifier of the wireless service provider.

In some cases, the method comprises identifying a sub-band (e.g., an OFDMA sub-band) for communications between the access point and the wireless device (block 235). Any of a number of factors can be used to identify a sub-band for communications between the multi-service provider wireless access point and the wireless device. Merely by way of example, in some cases, the wireless device might only be capable of communicating on a particular sub-band, which generally would be the sub-band on which the multi-service provider wireless access point received the original communication from the wireless device, and the sub-band can be identified as the sub-band on which the original communication was received.

Alternatively and/or additionally, the multi-service provider wireless access point might identify the sub-band based on the frequency range that is allocated to the wireless service provider that serves the wireless device (which can be identified, e.g., as described above). In this way, for example, the multi-service provider wireless access point can select a sub-band that is appropriate for the wireless device and corresponding provider. In such embodiments, identifying the sub-band might comprise accessing a database that correlates wireless service providers with allocated frequency ranges. (This database might be the same database the correlates wireless identifiers with wireless service providers and/or might be a different database. As a general matter, the database(s) described herein might be distributed, replicated, tiered, hierarchical, or organized/arranged in any other suitable manner.)

The method then might further comprise searching the database for a record corresponding to the identified wireless service provider; that record, then, would have a field identifying one or more frequency ranges allocated to that wireless service provider, and the multi-service provider wireless access point then could choose a sub-band corresponding to that frequency range. (It should be noted, of course, that in communications originating from the service provider, the identity of the service provider can be determined from such communications, either implicitly, e.g., based on the source address of the communication packets, or explicitly, based on some identifier provided with the communications.)

As noted above, the identified sub-band might be mapped to one or more antennas of the access point, and the method 200 can further include, at block 240, communicating with the wireless device using the antenna(s) mapped to the identified sub-band.

In some aspects, the method 200 might further comprise receiving, at the multi-service provider wireless access point, one or more subsequent communications from the wireless device (block 245), and/or routing, from the multi-service provider wireless access point, the one or more subsequent communications to the identified wireless service provider (block 250), e.g., over the uplink connection. Merely by way of example, the uplink connection might comprise a packet data connection (e.g., an Internet Protocol ("IP") connection. The multi-service provider wireless access point, then, might packetize the communications received from the wireless device, address the packets to a network address corresponding to the identified wireless service provider, and transmit the packets (comprising the subsequent communications) over the uplink connection. Using standard routing techniques, those packets then would be routed to the appropriate wireless service provider. By the same token, packets received from the wireless service provider would be transmitted (e.g., using the radio, the sub-band, and/or the antenna appropriate for that wireless service provider and/or wireless device) for reception by the wireless device.

Figure 3:
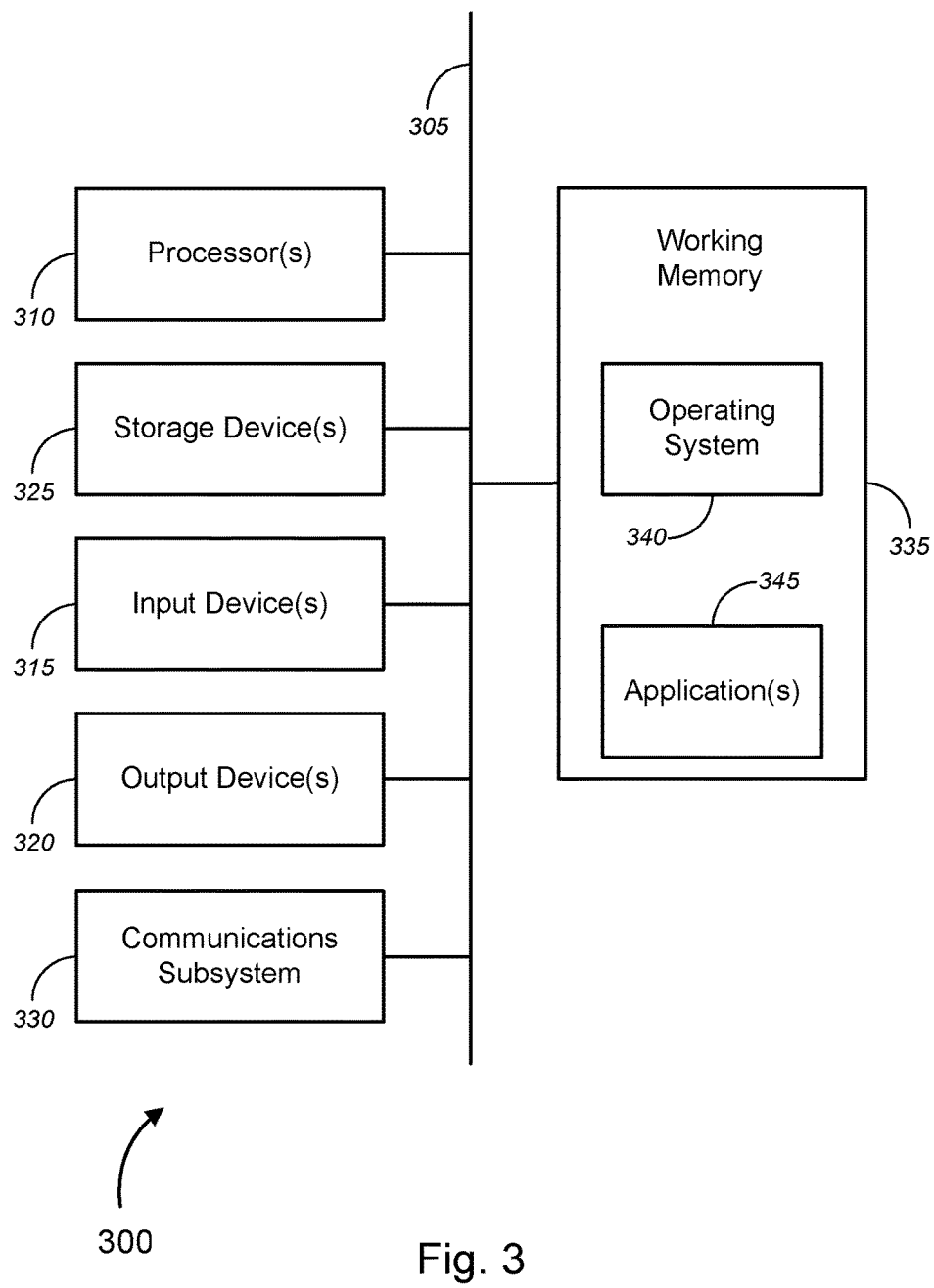
FIG. 3 is a generalized schematic diagram illustrating a computer system, in accordance with various embodiments.

FIG. 3 provides a schematic illustration of one embodiment of a computer system 300 that can perform the methods provided by various other embodiments, as described herein, and/or can function as the processing system of a multi-service provider wireless access point. It should be noted that FIG. 3 is meant only to provide a generalized illustration of various components, of which one or more (or none) of each may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include one or more processors 310, including without limitation one or more general-purpose processors and/or one or more special-purpose processors (such as digital signal processing chips, graphics acceleration processors, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 300 might also include a communications subsystem 330, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 330 may permit data to be exchanged with a network (such as the network described below, to name one example), with other computer systems, and/or with any other devices described herein. In many embodiments, the computer system 300 will further comprise a working memory 335, which can include a RAM or ROM device, as described above.

The computer system 300 also may comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another computer readable medium, such as one or more of the storage device(s) 325. Merely by way of example, execution of the sequences of instructions contained in the working memory 335 might cause the processor(s) 310 to perform one or more procedures of the methods described herein.

The terms "machine readable medium" and "computer readable medium," as used herein, refer to any medium that participates in providing data that causes a machine to operation in a specific fashion. In an embodiment implemented using the computer system 300, various computer readable media might be involved in providing instructions/code to processor(s) 310 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 325. Volatile media includes, without limitation, dynamic memory, such as the working memory 335. Transmission media includes, without limitation, coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a storage device 325 either before or after execution by the processor(s) 310.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of providing wireless service for multiple service providers from a single access point, the method comprising:
    providing a multi-service provider wireless access point having one or more radios to communicate with wireless devices and an uplink interface to provide an uplink connection to a plurality of wireless service providers, wherein the multi-service provider wireless access point further comprises a plurality of antennas;
    receiving, at the multi-service provider wireless access point, a communication from a wireless device;
    identifying a wireless service provider serving the wireless device, wherein the wireless service provider is associated with a first mobile switching center (MSC);
    communicating with the wireless device;
    receiving, at the multi-service provider wireless access point, one or more subsequent communications from the wireless device;
    routing, from the multi-service provider wireless access point, the one or more subsequent communications to the identified wireless service provider, over the uplink connection;
    determining, via the multi-service provider wireless access point, whether the one or more subsequent communications should be routed to an alternate MSC, different from the first MSC, operated by a second wireless service provider; and
    routing, via the uplink connection and responsive to a determination that the alternate MSC should be used, the one or more subsequent communications to the alternate MSC.

2. The method of claim 1, wherein the one or more radios comprise one or more software defined radios.

3. The method of claim 1, wherein the one or more radios consist of a single radio.

4. The method of claim 3, wherein the plurality of wireless service providers collectively communicate on a plurality of frequency bands, and wherein the single radio is configured to communicate on the plurality of frequency bands.

5. The method of claim 3, wherein the single radio employs orthogonal frequency-division multiple access ("OFDMA") modulation.

6. The method of claim 1, further comprising:
    collecting, at the multi-service provider wireless access point, an identifier of the wireless device from the communication.

7. The method of claim 6, wherein identifying a wireless service provider comprises identifying the wireless service provider based at least in part on the identifier of the wireless device.

8. The method of claim 1, further comprising identifying a sub-band as a frequency range that is allocated to the identified wireless service provider.

9. The method of claim 8, wherein identifying the sub-band as a frequency range that is allocated to the identified wireless service provider comprises:
    accessing a database correlating wireless service providers with allocated frequency ranges; and
    searching the database for a record corresponding to the identified wireless service provider.

10. The method of claim 1, wherein the one or more radios comprise a long term evolution ("LTE") radio.

11. The method of claim 1, wherein the one or more radios comprise a WiFi radio.

12. The method of claim 1, wherein the identifier is a mobile telephone number.

13. The method of claim 1, wherein the identifier is an electronic serial number ("ESN").

14. The method of claim 1, wherein the identifier is an media access control ("MAC") address.

15. The method of claim 1, wherein the uplink connection comprises an Ethernet connection.

16. The method of claim 1, wherein the uplink connection comprises a passive optical network ("PON") circuit.

17. The method of claim 1, wherein the uplink connection comprises a digital subscriber line ("DSL") connection or a Data Over Cable Service Interface Specification ("DOCSIS") connection.

18. The method of claim 1, wherein routing one or more subsequent connections to the identified wireless service provider comprises:
    addressing the one or more subsequent connections to a network address corresponding to the identified wireless service provider; and
    transmitting the one or more subsequent communications over the uplink connection.

19. The method of claim 1, wherein identifying a wireless service provider comprises:
    accessing a database correlating wireless device identifiers with wireless service providers; and
    searching the database for a record containing the identifier of the wireless device.

20. The method of claim 19, wherein the database identifies the first mobile switching center ("MSC") of the identified service provider, the method further comprising:
    updating the database to identify the alternate MSC as serving the wireless device; and
    routing communications from the wireless device to the different MSC.

21. The method of claim 19, further comprising:
    storing the database at the multi-service provider wireless access point.

22. The method of claim 21, wherein accessing the database comprises accessing the database over the uplink connection.

23. The method of claim 19, wherein the database is remote from the multi-service provider wireless access point.

24. The method of claim 1, further comprising:
    registering the wireless device with a wireless network operated by the wireless service provider, based on the received communication from the wireless device.

25. A multi-service provider wireless access point, comprising:
    one or more radios to communicate with wireless devices;
    an uplink interface to provide an uplink connection to a plurality of wireless service providers;
    a processor in communication with the one or more radios and the uplink interface; and
    a non-transitory machine readable medium having encoded thereon a set of instructions executable by the processor to:
        receive a communication from a wireless device;
        identify a wireless service provider serving the wireless device, wherein the wireless service provider is associated with a first mobile switching center (MSC);

communicate with the wireless device;
receive one or more subsequent communications from the wireless device;
route the one or more subsequent communications to the identified wireless service provider, over the uplink connection;
determine, whether the one or more subsequent communications should be routed to an alternate MSC, different from the first MSC, operated by a second wireless service provider; and
route, response to a determination the alternate MSC should be used, the one or more subsequent communications to the alternate MSC.

* * * * *